Patented Oct. 21, 1947

2,429,579

UNITED STATES PATENT OFFICE 2,429,579

PROCESS FOR PREPARING VEGETABLE PROTEIN-POLYPHOSPHATE COMPOUNDS

Artemy A. Horvath, Pittsburgh, Pa., assignor to Hall Laboratories, Inc., Pittsburgh, Pa., a corporation of Pennsylvania No Drawing. Application April 8, 1944, Serial No. 530,237

7 Claims. (Cl. 260—112)

This invention relates to a process of producing a vegetable protein-polyphosphate compound.

Protein is a valuable material which has many uses as, for example, in the sizing of paper, the preparation of foods, the preparation of glues and plastics. It is obtained by extraction of various protein-containing materials such as cotton seed or cotton seed meal, soybeans or soybean meal, corn or corn meal, copra from which the oil has been extracted, and from other cereal grains. According to my invention, I may use any of these starting materials or other suitable starting materials including alfalfa.

In the past the extraction of protein has been obtained by employing either alkaline solutions or solutions of neutral salts. Each of these types of extraction has certain objections. The alkaline solutions denature the protein. Part of the protein in the material to be treated is bound to phosphatides which of themselves are valuable materials. Where neutral salt solutions are employed in the extraction of proteins, it is difficult to separate the proteins from the phosphatides.

In accordance with my invention I may employ a weak solution of an alkali-metal phosphate glass, such for example as the sodium phosphate glass commonly known as Graham's salt, having a molar ratio of $Na_2O$ to $P_2O_5$ of about 1:1 or the commercial sodium phosphate glasses. Commercial sodium phosphate glasses suitable for the invention have molar ratios of $Na_2O$ to $P_2O_5$ between approximately 1.1:1 and 1.4:1, but I may employ a solution of an alkali-metal phosphate glass having a molar ratio of alkali-metal oxide to $P_2O_5$ between about 0.9:1 and 1.7:1, the preferred ratio being about 1.0:1 to 1.4:1. In place of the alkali-metal phosphate glasses I may employ alkali-metal tripolyphosphate or alkali-metal trimetaphosphate. The alkali-metal phosphate glasses, the alkali-metal tripolyphosphates and the alkali-metal trimetaphosphates may be defined as "alkali-metal polyphosphates," each of these materials having a molar ratio of alkali-metal oxide to $P_2O_5$ of less than 2:1. When a solution of a sodium polyphosphate, for example sodium tripolyphosphate, is used for extracting the protein from a protein-containing material it is believed that the solution contains a protein-tripolyphosphate in which the tripolyphosphate radical ($P_3O_{10}$) is loosely linked to the protein. When the protein-tripolyphosphate solution is acidified a protein-tripolyphosphate compound is coagulated. The term "protein-polyphosphate compound" as used herein means a compound in which protein is linked with polyphosphate radical. A polyphosphate radical is defined herein as the radical of an alkali-metal phosphate in which the ratio of alkali-metal oxide to $P_2O_5$ is less than 2:1.

In describing the invention further I shall refer to sodium phosphate glass, meaning a readily available commercial sodium phosphate glass having the ratio of $Na_2O$ to $P_2O_5$ of about 1.1:1, but it will be understood that the other phosphates mentioned may be employed.

I may start with any suitable protein-containing material, for example, cotton seed oil meal (the meal left after the oil has been removed from the cotton seed). The cotton seed oil meal is leached with a dilute solution of sodium phosphate glass. The preferred concentration of sodium phosphate glass is about 0.2% but this is not critical and any suitable dilute solution may be employed, say, within the concentrations of about .05% and 5%. The leaching may be carried out at room temperature or the mash may be slightly warmed. Any suitable device such, for example, as a vat provided with a stirrer may be employed, and where it is desired to warm the leaching solution the vat may be provided with a heating coil. The meal should be comminuted as fine as possible before extraction as this facilitates the extraction of the protein. The extraction solution is one having a pH above 5, the preferred pH being between about 6 and 8. It is advisable that the pH be not above 9 because in such case there is danger of denaturing the protein.

After the extraction step, the solution is separated from the residue and the solution is adjusted to a pH of 4.5 or under but not below a value of about pH2, the preferred pH in this step being about 3.5 to 4. This lowering of the pH of the solution causes coagulation or precipitation of a protein-polyphosphate compound. This compound is separated from the solution by any suitable means such, for example, as centrifuging or filtering and the precipitate is washed with water and dried. The precipitate is in a form which is readily separated from the solution and washed, as contrasted with the flocculent precipitate obtained by other known process. The drying of the washed precipitate obtained according to my process is preferably carried out in a vacuum employing a low temperature. The washed and dried material is amorphous and substantially free from water-soluble salts and from free acid.

Treatment of the starting material with the sodium phosphate glass, according to my invention, loosens the bonds between the protein and the phosphatides, thereby rendering it easier to recover the phosphatides either from the residue of the extraction or from the solution remaining after the protein-polyphosphate compound has been removed from the extraction by acidification than would be the case if other extraction solutions had been employed.

In the process which has been described the solution employed for extraction was a solution of sodium phosphate glass. However, the extraction solution may contain in addition to the phosphate glass, one or more neutral salts, alkaline reacting salts, or alkalies. Suitable neutral salts are sodium chloride, sodium sulphate, ammonium sulphate, calcium chloride, barium chloride, and magnesium sulphate. Suitable alkaline salts or alkalies are sodium carbonate, disodium phosphate, trisodium phosphate, ammonium carbonate, sodium hydroxide, and ammonium hydroxide. The corresponding potassium neutral salts, alkaline salts or alkalies may be employed in place of the sodium or ammonium salts.

The sodium phosphate glass having a molar ratio of $Na_2O$ to $P_2O_5$ of about 1.1:1 is a suitable and practical material for extraction of proteins, but it will be understood that phosphate glasses having different ratios of sodium oxide or potassium oxide to $P_2O_5$ may be employed, or I may use the crystalline materials, sodium or potassium tripolyphosphate or sodium or potassium trimetaphosphate either alone or with neutral or alkaline materials.

It is to be understood that the invention is not limited to the preferred embodiments which have been given merely for purposes of illustration, but that it may be otherwise embodied or practiced within the scope of the following claims.

I claim:

1. The process of producing a protein-polyphosphate compound, which comprises treating vegetable protein-containing material with a solution of at least one material selected from the group consisting of phosphate glass, alkali-metal tripolyphosphate and alkali-metal trimetaphosphate, the solution having a pH between about 5 and 9, separating the solution from the residue, lowering the pH of the solution to between about 2 and 4.5 to precipitate a protein-polyphosphate compound, separating the protein-polyphosphate compound from the solution and washing and drying it.

2. The process of producing a protein-polyphosphate compound, which comprises treating vegetable protein-containing material with a solution of phosphate glass, the solution having a pH between about 5 and 9, separating the solution from the residue, lowering the pH of the solution to between about 2 and 4.5 to precipitate a protein-polyphosphate compound, separating the protein-polyphosphate compound from the solution and washing and drying it.

3. The process of producing a protein-polyphosphate compound, which comprises treating vegetable protein-containing material with a solution of sodium phosphate glass having a molar ratio of $Na_2O$ to $P_2O_5$ between about 0.9:1 and 1.7:1, the solution having a pH between about 5 and 9, separating the solution from the residue, lowering the pH of the solution to between about 2 and 4.5 to precipitate a protein-polyphosphate compound, separating the protein-polyphosphate compound from the solution and washing and drying it.

4. The process of producing a protein-polyphosphate compound, which comprises treating vegetable protein-containing material with a solution containing about .05% to 5% of sodium phosphate glass having a molar ratio of $Na_2O$ to $P_2O_5$ between about 1.0:1 and 1.4:1, said solution having a pH between about 5 and 9, lowering the pH of the solution to between about 2 and 4.5 to precipitate a protein-polyphosphate compound, separating the protein-polyphosphate compound from the solution and washing and drying it.

5. The process of producing a protein-polyphosphate compound, which comprises treating vegetable protein-containing material with a solution of at least one material selected from the group consisting of phosphate glass, alkali-metal tripolyphosphate and alkali-metal trimetaphosphate, the solution having a pH between about 6 and 8, separating the solution from the residue, lowering the pH of the solution to between about 2 and 4.5 to precipitate a protein-polyphosphate compound, separating the protein-polyphosphate compound from the solution and washing and drying it.

6. The process of producing a protein-polyphosphate compound, which comprises treating vegetable protein-containing material with a solution of at least one material selected from the group consisting of phosphate glass, alkali-metal tripolyphosphate and alkali-metal trimetaphosphate, the solution also containing at least one member selected from the group consisting of inorganic neutral and alkaline salts and the hydroxides of ammonium and alkali metals, the solution having a pH between about 5 and 9, separating the solution from the residue, lowering the pH of the solution to between about 2 and 4.5 to precipitate a protein-polyphosphate compound, separating the protein-polyphosphate compound from the solution and washing and drying it.

7. The process of producing a protein-polyphosphate compound, which comprises treating vegetable protein-containing material with a solution of sodium phosphate glass having a molar ratio of $Na_2O$ to $P_2O_5$ between about 0.9:1 and 1.7:1, the solution also containing at least one member selected from the group consisting of inorganic neutral and alkaline salts and the hydroxides of ammonium and alkali metals, the solution having a pH between about 5 and 9, separating the solution from the residue, lowering the pH of the solution to between about 2 and 4.5 to precipitate a protein-polyphosphate compound, separating the protein-polyphosphate compound from the solution and washing and drying it.

ARTEMY A. HORVATH.

REFERENCES CITED

The following references are of record in the file of this patent:

UNITED STATES PATENTS

| Number | Name | Date |
| --- | --- | --- |
| 2,194,835 | Nickerson | Mar. 26, 1940 |
| 2,194,867 | Olcott | Mar. 26, 1940 |
| 2,238,329 | Julian | Apr. 15, 1941 |
| 2,241,868 | Reimann | May 13, 1941 |
| 2,274,004 | Shildneck | Feb. 24, 1942 |
| 2,379,929 | Rushton | July 10, 1945 |

FOREIGN PATENTS

| Number | Country | Date |
| --- | --- | --- |
| 121,141 | Great Britain | Dec. 12, 1918 |

OTHER REFERENCES

Briggs, Jour. Biol. Chem., vol. 134, pp. 261-272 (1940).

Perlmann, Jour. Biol. Chem., vol. 137, pp. 707-711 (1941).